Figure 5:
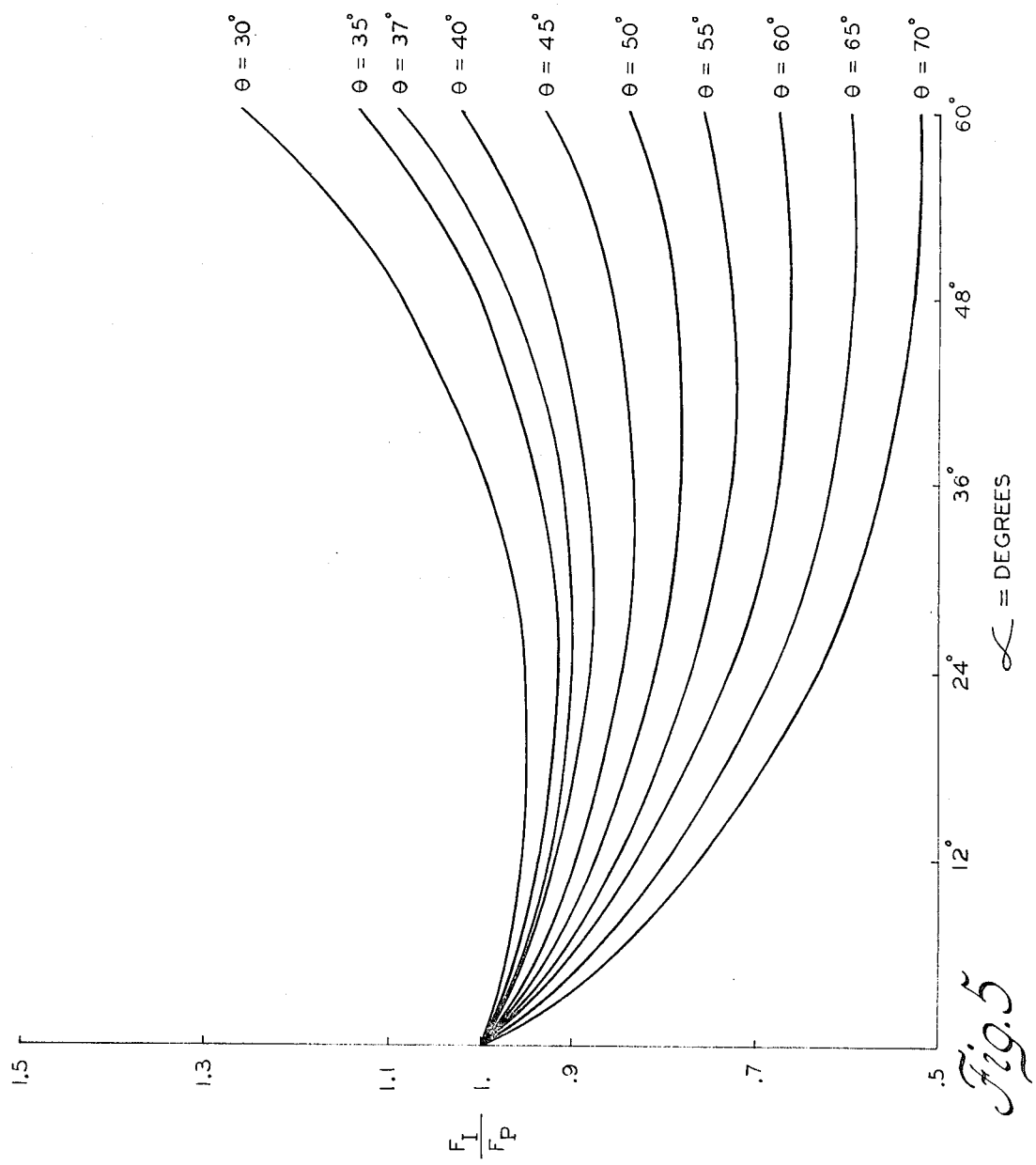

United States Patent
Brooks et al.

[15] 3,678,763
[45] July 25, 1972

[54] ACCELERATION SENSOR
[72] Inventors: Rodney A. Brooks, Bayside; Vincent A. Orlando, Greendale, both of Wis.
[73] Assignee: General Motors Corporation, Detroit, Mich.
[22] Filed: Aug. 23, 1971
[21] Appl. No.: 173,806

[52] U.S. Cl............................................73/514, 200/61.45
[51] Int. Cl.................................G01p 15/02, H01h 35/14
[58] Field of Search......................73/492, 514; 116/114 AH; 200/61.45 R, 61.45 M, 61.45, 61.49, 61.51

[56] References Cited

UNITED STATES PATENTS 3,229,060  1/1966  Russakov...........................200/61.45

Primary Examiner—James J. Gill
Attorney—W. E. Finken et al.

[57] ABSTRACT

A sensor includes a cylindrical mass of predetermined weight supported on a deflectable rod and movable within a sector shaped recess including angularly diverging walls defining an included angle $2\theta$. The mass is located in unactuated position in tangential engagement with the walls adjacent their proximal ends by an axial magnet having its axis coplanar with a bisector of the included angle. The magnet applies a preload force $F_p$ to the mass along a bisector of the included angle. When an impulse force $F_I$ greater than a predetermined amplitude and time is applied to the mass within the predetermined included angle of response $2\alpha$ max, the mass will move with generally uniform sensitivity to actuated position in engagement with a deflectable spring contact finger in accordance with with:

$$\frac{F_I}{F_P} > \frac{\mu \sin \theta + \cos \theta}{\cos (\alpha - \theta) - \mu \sin (\alpha - \theta)}$$

where $\mu$ is the coefficient of friction between the mass and one of the walls of the recess and $\alpha$ is the angle of the vector of $F_I$ with respect to the bisector of $2\theta$. In order to achieve generally uniform sensitivity to applied impulse forces within the predetermined included angle of response $2\alpha$ max, $F_I/F_P$ is determined for various values of $\theta$ and $\lambda$ up to $\lambda$ max and $\theta$ is then selected to approach $F_I/F_P$ equalling a constant with a minimum range or deviation, such as $F_I/F_P \geq 0.9$ and $\leq 1.1$ for each value of $\alpha$ up to $\alpha$ max.

2 Claims, 5 Drawing Figures

Patented July 25, 1972
3,678,763
2 Sheets-Sheet 1
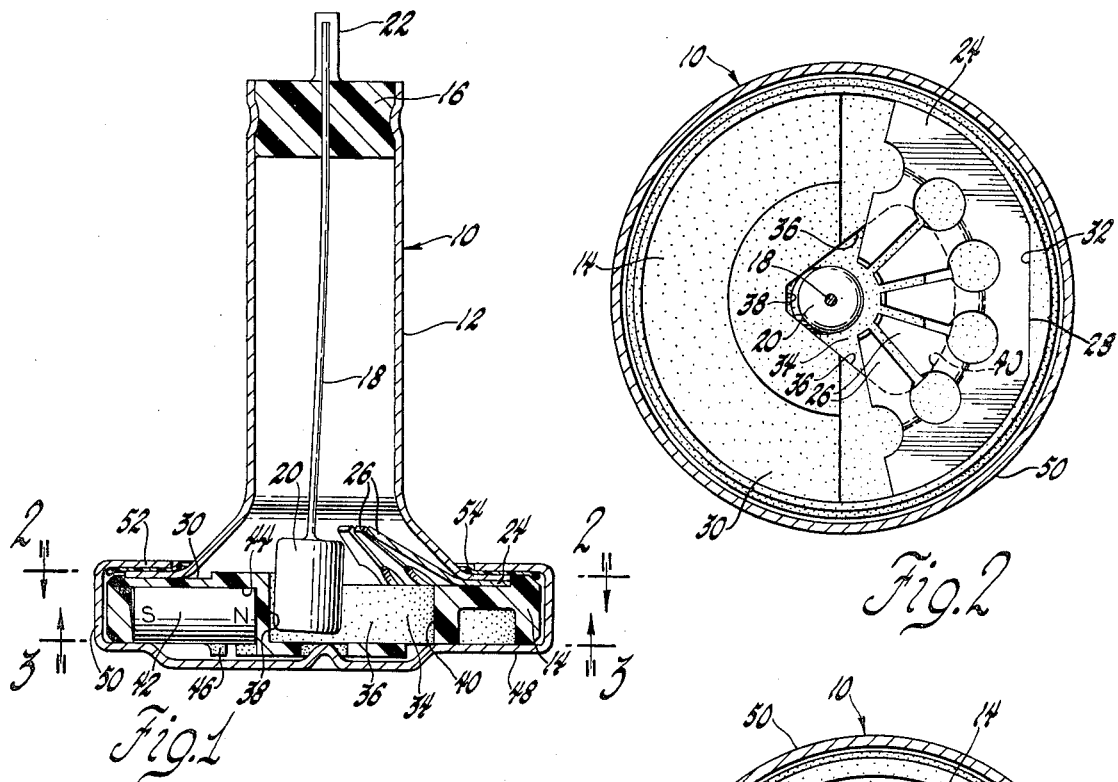
Fig.1
Fig.2
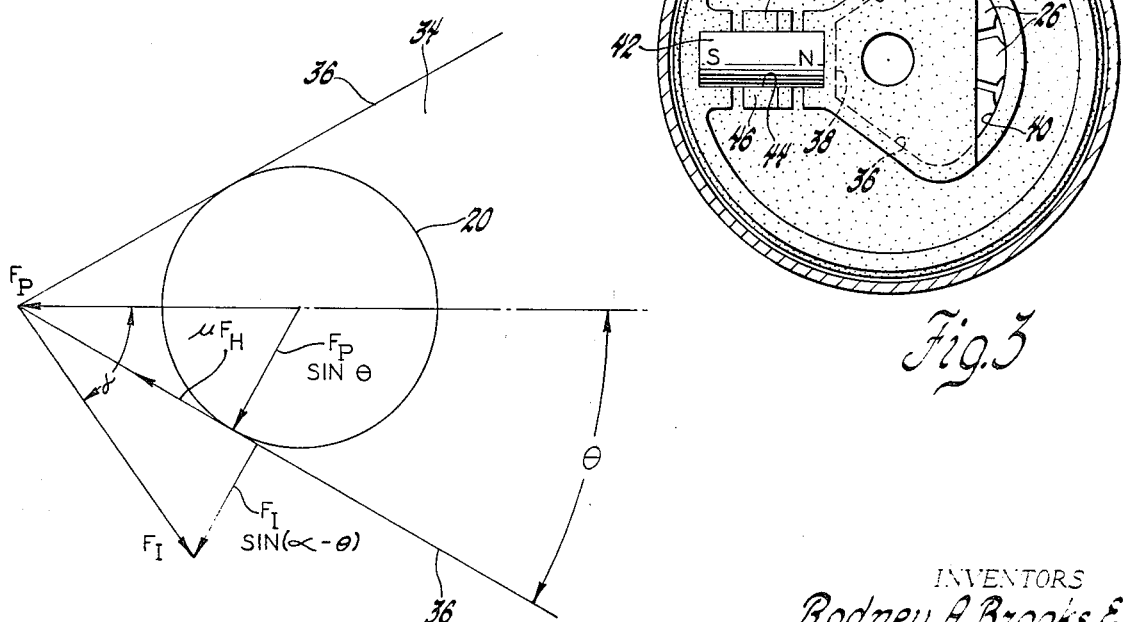
Fig.4
Fig.3
INVENTORS
Rodney A. Brooks, &
BY Vincent A. Orlando
Herbert Furman
ATTORNEY INVENTORS
Rodney A. Brooks, &
BY Vincent A. Orlando Herbert Furman
ATTORNEY

ACCELERATION SENSOR

SPECIFICATION

This invention relates generally to sensors having a mass movable from unactuated to actuated positions in response to acceleration forces greater than a predetermined amplitude and time applied thereto and more particularly to such sensors having generally uniform sensitivity to all such forces applied thereto within the predetermined included angle of response of the sensor.

Sensors of this type are particularly useful in vehicle body occupant restraint systems to sense acceleration pulses applied to the body and to actuate a source for inflation of an occupant restraint cushion when a pulse greater than a predetermined amplitude and time is sensed within the predetermined included angle of response of the sensor. It is important that the response or sensitivity of the sensor be generally uniform to all pulses of the required amplitude and time which are applied to the body within the predetermined included angle of response.

This invention provides a sensor having generally uniform sensitivity to pulses of the required amplitude and time which are applied in a horizontal plane to a vehicle body within a predetermined included angle or response. The sensor generally includes a mass movable relative to the constraining angularly related walls of a sector shaped recess from an unactuated position adjacent the proximal ends of such walls to an actuated position adjacent the distal ends thereof with generally uniform sensitivity to all acceleration forces greater than a predetermined amplitude and time applied to the mass in a plane containing the predetermined or desired included angle of response of the sensor. The mass is of annular shape, such as cylindrical, and is located in unactuated position in tangential engagement with the angularly related walls by a preload force obtained from a magnet directed along the bisector of the included angle defined by the angularly related walls. It has been found that the included angle of the constraining walls, $2\theta$, must bear a particular relationship to the predetermined included angle of response $2\alpha$ max of the sensor in order that the desired generally uniform sensitivity be obtained to forces within the predetermined included angle of response.

It is known that when:

$$\frac{F_I}{F_P} > \frac{\mu \sin \theta + \cos \theta}{\cos (\alpha - \theta) - \mu \sin (\alpha - \theta)}$$

the mass will move to actuated position, where $F_I$ is the vector of the force applied to the mass, $F_P$ is the vector of the preload force along the bisector of $2\theta$ and $2\alpha$ max, $\mu$ is the coefficient of friction between the mass and one of the constraining angularly related walls, $\theta$ is one-half of the included angle defined by such walls, and $\alpha$ is the angle between the vector of $F_I$ and the bisector of $2\theta$. In general, the predetermined included angle of response, $2\alpha$ max, of the sensor is greater than $2\theta$. By selecting the materials of the mass and constraining walls, the value of $\mu$ can be determined. Thereafter, by substituting various sets of values of $\theta$ and $\alpha$, up to $\alpha$ max, in this expression, the resultant values of $F_I/F_P$ for each such set can be determined. A value of $\theta$ is then selected to approach $F_I/F_P$ equalling a constant, with a minimum deviation or range, such as $(F_I/F_P) \geq 0.9$ and $\leq 1.1$ for any value of $\alpha$ up to $\alpha$ max. This ensures that the mass will move with generally uniform sensitivity to all forces of similar amplitude and time applied thereto within the predetermined included angle of response.

It is therefore the primary object of this invention to provide a sensor wherein a mass is movable from unactuated to actuated positions with generally uniform sensitivity to all acceleration forces of substantially the same predetermined amplitude and time applied thereto within a predetermined or desired included angle of response.

This and other objects of the invention will be readily apparent from the following specification and drawings wherein:

FIG. 1 is a sectional view of a sensor according to this invention in normal or unactuated position;
FIG. 2 is a sectional view taken generally along the plane indicated by line 2—2 of FIG. 1;
FIG. 3 is a sectional view taken generally along the plane indicated by line 3—3 of FIG. 1;
FIG. 4 is a diagrammatical view; and
FIG. 5 is a diagrammatical view.

Referring now generally to FIGS. 1 through 3, the sensor 10 shown therein is the same as that shown in copending application Ser. No. 158,170 Porter et al., filed June 30, 1971 and assigned to the assignee of this invention. Accordingly, only a brief description will be given herein. Sensor 10 includes a generally vertically extending tubular housing 12 and a circular base member 14 of plastic material. A plastic plug 16 is retained within the upper open end of housing 12 and a deflectable spring rod 18 extends through the plug and is suitably secured thereto to locate the rod coaxial of the housing 12. The lower end of the rod supports and is suitably secured to a cylindrical mass 20 of predetermined weight. The end of the rod 18 upwardly of the plug and an axial tab 22 of the housing 12 are connected across a source of power and a mechanism to be actuated by the sensor 10.

A contact plate 24 includes a plurality of angularly extending cantilever spring fingers 26. The periphery of the contact plate is generated about the axis of housing 12 except for a flat 28 which indexes with a flat of the lower circular terminal flange of housing 12. The plate 24 is suitably secured to the lower flange of the housing to ensure electrical connection therebetween.

The upper wall of the base member 14 includes a shallow slightly stepped recess 30, FIG. 2, the deeper portion of which partially receives the housing flange and fully receives the contact plate 24, and the shallower portion of which partially receives only the housing flange. A flat 32 of such recess indexes to the flat 28 of the plate 24 and the flat of the housing flange to thereby index the housing 12 to the base member. A generally sector shaped recess 34 opens through the upper wall of member 14 and is defined by a pair of angularly related linear side walls 36 which are integral with member 14 and define an included angle $2\theta$. Walls 36 are joined adjacent their proximal ends by an integral linear wall 38 and adjacent their distal ends by an integral circular wall 40 generated about the axis of housing 12. The spring fingers 26 extend angularly over the recess 34 from the arcuate end thereof. The lower opening of the recess is partially closed by a lower apertured planar wall, FIG. 3, formed integral with walls 36, 38, and 40.

An axial pole permanent magnet 42 is received within a semi-cylindrically shaped integral recess 44, FIGS. 1 and 3, of the base member 14 and retained by deflectable integral tabs 46 of the base member 14.

A lower cover plate 48 periphery seats on member 14 and includes a peripheral flange 50 which surrounds member 14 and merges into a flange 52 crimped over the housing lower flange to assemble the housing 12 and base member 14. A resilient washer 54 is provided between the housing flange and flange 52.

When the sensor is in unactuated position as shown in FIGS. 1 and 2, the magnet 42 applies a preload force $F_P$ to the mass to magnetically attract the mass into tangential engagement with the walls 36 adjacent their proximal ends. This deflects the lower portion of the rod 18 out of coaxial relationship with the housing 12. When an impulse force greater than a predetermined amplitude and time is applied to the mass 20 in a horizontal plane containing the predetermined included angle of response of the sensor, as will be explained, the mass 20 moves to the right as viewed in FIGS. 1 and 2 and toward the arcuate wall 40 to engage the upper peripheral edge thereof with one or more of the fingers 26 and close the circuit across the source of power and the mechanism to be actuated. The upper peripheral edge of the mass upwardly deflects the spring finger(s) engaged thereby so that the spring finger(s) in turn apply a downward force on such mass to in turn apply a columnar load on rod 18 in tension rather than in compression. This prolongs the useful life of the spring rod. The arcuate wall 40 limits the extent of movement of the mass under acceleration pulses and is engaged by the mass before the mass permanently deforms any of the spring fingers 26 engaged thereby.

The sensor 10 of this invention has generally uniform sensitivity to similar impulse forces greater than predetermined amplitude and time applied thereto within the predetermined included angle of response.

It has been found that generally uniform sensitivity can be obtained only if the predetermined included angle of response $2\alpha$ max and the included angle $2\theta$ defined by walls 36 have a particular relationship to each other, as will now be described.

FIG. 4 is a diagrammatic view showing: the tangential engagement of the mass 20 with the side walls 36 of the recess 34 adjacent their proximal ends; $\theta$ as half of the included angle $2\theta$ defined by walls 36; $\alpha$ max as half of the predetermined included angle of response $2\alpha$ max of the sensor; $F_P$ as the vector of the preload force applied to the mass 20 by the magnet 42 along a bisector of the included angle $2\theta$ to hold the mass 20 in tangential engagement with the walls 36; $\mu$ as the coefficient of static friction between the mass 20 and one wall 36; $F_I$ as the vector of an impulse force greater than a predetermined amplitude and time applied to the mass 20; $F_P \sin \theta$ as the component of vector $F_P$ normal to the wall 36; $F_I \sin (\alpha - \theta)$ as the component of vector $F_I$ normal to the plane of wall 36; and $F_H$ as the total of the components of vectors $F_I$ and $F_P$ which are perpendicular to the tangent point of the mass 20 and the wall 36.

The mass 20 will be displaced when:

$$\frac{F_I}{F_P} > \frac{\mu \sin \theta + \cos \theta}{\cos (\alpha - \theta) - \mu \sin (\alpha - \theta)}$$

This results from the following derivation:
Motion will occur if:
$F_I \cos (\alpha - \theta) > \mu F_H + F_P \cos \theta$
Since $F_H = F_I \sin (\alpha - \theta) + F_P \sin \theta$
∴ $F_I \cos (\alpha - \theta) > \mu [F_I \sin (\alpha - \theta) + F_P \sin \theta] + F_P \cos \theta$
∴ $F_I \cos (\alpha - \theta) - \mu F_I \sin (\alpha - \theta) > \mu F_P \sin \theta + F_P \cos \theta$
∴ $F_I [\cos (\alpha - \theta) - \mu \sin (\alpha - \theta)] > F_P (\mu \sin \theta + \cos \theta)$ $$\therefore \frac{F_I}{F_P} > \frac{\mu \sin \theta + \cos \theta}{\cos (\alpha - \theta) - \mu \sin (\alpha - \theta)}$$

FIG. 5 is a view showing various values of $F_I/F_P$ for various angles $\alpha$, 0° to 60° ($\alpha$ max) and $\theta$, 30° to 70°. $\mu$ is a constant, 0.2.

The mass 20 will not move into engagement with one or more of the spring fingers 26 with absolute uniform sensitivity under all acceleration pulses of the predetermined amplitude and time applied to the mass within the included angle of response $\alpha$ max. For example, if $\theta$ is 70°, it will require increasingly less acceleration pulses to move the mass to actuated position as such pulses are applied at increasing angular differences to $F_P$, or the bisector of $2\theta$. However, if $\theta$ is 30°, it will require acceleration pulses less than the predetermined value to move the mass to actuated position for pulses applied up to approximately 36° to $F_P$, or the bisector of $2\theta$. Increasingly greater acceleration pulses will move the mass to actuated position if applied from slightly greater than 36° to 60° to $F_P$, or the bisector of $2\theta$. Accordingly, the desired relationship of $F_I/F_P$ equalling a constant cannot be obtained throughout the desired angle of response of the sensor 10, and accordingly, absolute uniform sensitivity likewise cannot be obtained.

Applicants have found that generally uniform sensitivity can be obtained if $F_I/F_P$ approaches a constant with a minimum deviation or range, such as $F_I/F_P \geq 0.9$ and $\leq 1.1$ for a particular value of $\theta$ when $\alpha$ ranges from 0° to $\alpha$ max. The sensor 10 has a predetermined included angle of response $2\alpha$ max of 120° and $\alpha$ max is thus 60°. From FIG. 5, it can be seen that $\theta$ must be 37° if generally uniform sensitivity is to be obtained for all values of $\alpha$ up to $\alpha$ max. Thus, walls 36 define an included angle of 74°.

By selecting a minimum deviation or range of $F_I/F_P$ equalling a constant, such as from 0.9 to 1.1, it can be seen that an angle $\theta$ of 37° best approximates the desired relationship of $F_P/F_P$ equalling a constant at a predetermined included angle of response of 120° since $F_I/F_P$ does not fall below 0.9 or above 1.1 or for any angle $\alpha$ up to 60°.

It has also been found that if a range of $F_I/F_P$ of 0.9 to 1.1 is followed in setting the included angle $2\theta$ between the walls 36 when the desired or predetermined included angle of response $2\alpha$ max has been selected, the time required for movement of the mass 20 into engagement with one or more of the spring fingers 26 remains generally constant regardless of the angular relationship of the force $F_I$ to $F_P$ or the bisector of the included angle $2\theta$. In other words, in the particular sensor 10, the time required for the mass 20 to engage one or more of the spring fingers 26 for all values of $\alpha$, from 0° to 60° remains generally constant. Thus the sensor 10 has generally uniform response or sensitivity over its predetermined included angle or response.

In accordance with this invention, it is therefore possible to select the included angle of response desired for the sensor 10, determine the coefficient of friction between the mass 20 and a wall 36, and thereafter determine the angular relationship of the walls 36 with respect to each other to define the included angle $2\theta$. It is also possible to determine the result of a change in $2\alpha$ max and also a change in the coefficient of friction between the mass 20 and a wall of the sector shaped recess.

Thus, this invention provides an improved sensor having generally uniform sensitivity over a predetermined included angle of response.

We claim:
1. A sensor comprising, in combination, sector means including constraining wall means defining a predetermined included angle $2\theta$, a mass, means applying a preload force $F_P$ to the mass along a bisector of $2\theta$ to hold the mass in unactuated position, the coefficient of friction between the mass and one of the wall means being $\mu$, the mass moving to an actuated position within the predetermined included angle under a force $F_I$ applied thereto at an angle $\alpha$ to the bisector of $2\theta$ and within a predetermined included angle of response $2\theta$ max, the values of $F_I$, $F_P$, $\mu$, $\theta$ and $\alpha$ being determined by the expression

$$\frac{F_I}{F_P} > \frac{\mu \sin \theta + \cos \theta}{\cos (\alpha - \theta) - \mu \sin (\alpha - \theta)}$$

to obtain generally uniform sensitivity of movement of the mass.

2. A sensor as recited in claim 1 wherein $F_I/F_P$ approaches a constant with a minimum deviation of $F_I/F_P \geq 0.9$ and $\leq 1.1$ for each value of $\alpha$ up to $\alpha$ max.

* * * * *

PO-1050
(5/69)

UNITED STATES PATENT OFFICE
CERTIFICATE OF CORRECTION

Patent No. 3,678,763          Dated July 25, 1972

Inventor(s) Rodney A. Brooks and Vincent A. Orlando

It is certified that error appears in the above-identified patent and that said Letters Patent are hereby corrected as shown below:

In the Abstract, in the third-to-the-last line, each of the two gammas "$\lambda$" should be changed to an alpha -- $\alpha$ --.

Column 4, line 17, "$\frac{F_P}{F_P}$" should read -- $\frac{F_I}{F_P}$ --.

Column 4, line 53, "$2\theta$ max" should read -- $2\alpha$ max --.

Signed and sealed this 1st day of May 1973.

(SEAL)
Attest:

EDWARD M. FLETCHER, JR.          ROBERT GOTTSCHALK
Attesting Officer          Commissioner of Patents